J. COATS.

Bee Hive.

No. 70,167.

Patented Oct 29, 1867.

United States Patent Office.

JOHN COATS, OF CAMDON, OHIO.

Letters Patent No. 70,167, dated October 29, 1867.

---

IMPROVEMENT IN BEE-HIVES.

---

The Schedule referred to in these Letters Patent and making part of the same.

---

TO ALL WHOM IT MAY CONCERN:

Be it known that I, JOHN COATS, of Camdon, in the county of Lorain, and State of Ohio, have invented certain new and useful Improvements in Bee-Hives; and I do hereby declare that the following is a full and complete description of the same, reference being had to the accompanying drawings, making a part of this specification, in which—

Figure 1:
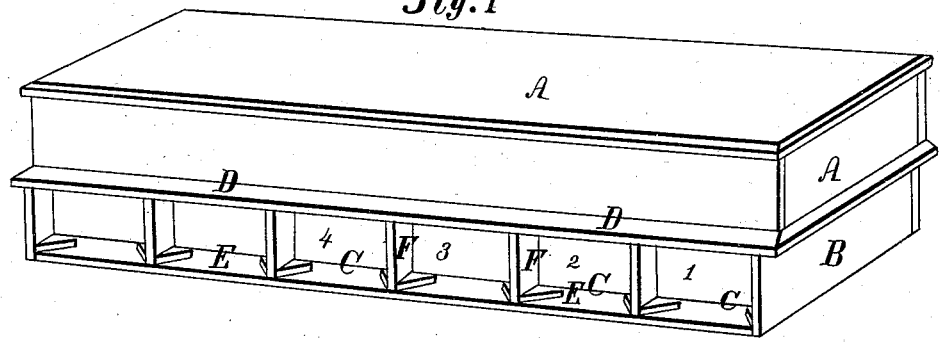
Figure 2:
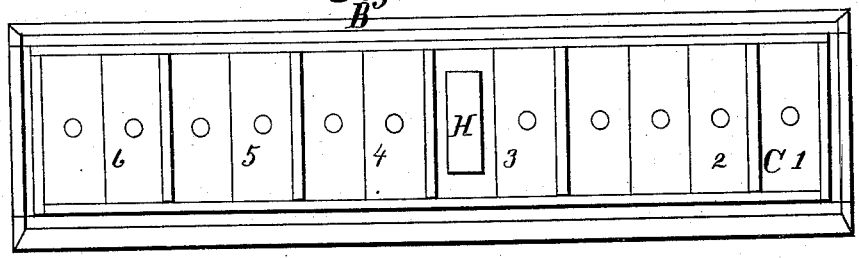
Figure 4:
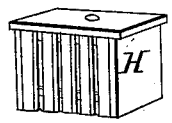
Figure 3:
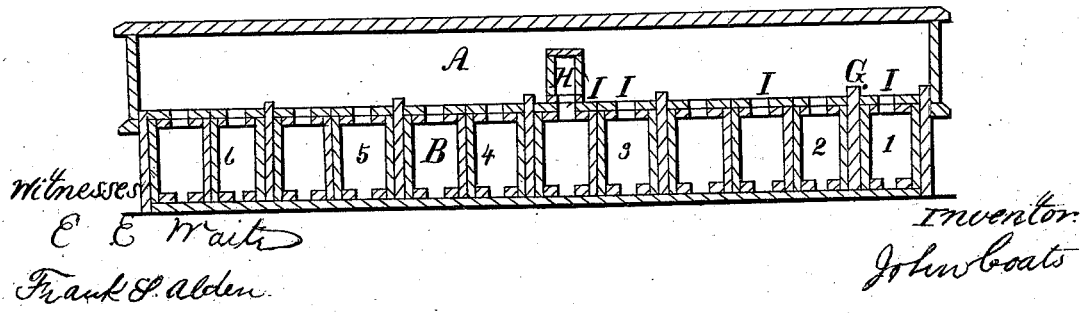

Figure 1 is a perspective view of the hive.
Figure 2 is a view with the top detached.
Figure 3 is a longitudinal section.
Figure 4 is a detached section.

Like letters of reference refer to like parts in the views.

The nature of this invention relates to an extension-hive, so constructed and arranged that a series of brood-boxes may be arranged consecutively any desired length, so as to form an extension-hive. These brood-boxes are so arranged in relation to each other that a partition is placed between two or more of said boxes, whereby, in case of swarming, the boxes containing the bees may be separated and an empty box placed to occupy the situation of the full hive, which when removed is placed beside an empty one, thus preventing the bees from swarming, and at the same time any one of the boxes may be taken out, or all of them, from the case, for the purpose of cleaning and removing moths, worms, &c.

This hive is constructed in two sections A B, fig. 1, of which A is the top or cover, and B the house in which the hives are placed, and which is shown with the top detached in fig. 2. This house or hive consists of a succession of hives or brood-boxes, which may be more or less in number, according to the number of swarms, or for convenience. 1, 2, 3, 4, &c., are the hives, six being represented in the drawing, and which may be increased or lessened in number according to the size of the swarm, as will hereafter be shown. C C, fig. 1, are the bee-doors, protected by a vestibule formed by the top and alighting-board D E and the sides F, and which communicate directly with the hives arranged side by side, as shown in fig. 2. A detached view of one of these hives or brood-boxes is shown in fig. 4, and which may be constructed as shown in the drawing, or in any other suitable way. These boxes or hives are fitted to the inside of the case or house B, so that they can be easily taken out or moved along; at the same time they are made to fit close, and thus afford no lodgment for the bee-moth. Section 1, as shown in fig. 2, consists of but one box or hive, and which, it will be seen, is divided off from the other hives by the partition-boards G, introduced between the single box 1 and the others, thus making a small hive for the accommodation of a small swarm of bees. The capacity of this hive can be enlarged by the addition of the adjoining box, No. 2, by withdrawing the division-board G, and moving along the box so as to bring it close to No. 1. The board is then inserted on the outer side of the box No. 2. Boxes thus doubled are shown in Nos. 6, 5, 4, 3. No. 2 shows a triple hive of three of the brood-boxes together for the use of a large colony of bees, and which may still be enlarged by the addition of other boxes, or made smaller by taking away the boxes, as the size of the colony may render it expedient.

It is well known that young swarms of bees leave the present hive in consequence of the want of room, the old hive being too small for the accommodation of the two swarms. By the use of this extension-hive the young brood is prevented from leaving the hive, simply by adding to the old hive, at the time of swarming, an empty box in the manner as above described, and thus the young bees find room at home, and are saved from going off, as they will do, in search of other accommodations, unless thus provided for.

Should the colony become too large in consequence of the addition of several boxes, a division of the swarm can be easily effected by a contraction of the hive by the removing of one or more of the boxes, as the size of the colony may determine, and placing it in some remote place, thus placing the bees, with all their various wants and movements, entirely under the control of the bee-master, with much less care, labor, and expense than can be done under the ordinary management of them. H, fig. 3, is a honey-box, constructed in the ordinary way, and placed upon the top of the brood-boxes, as shown in fig. 3, I being the holes for the passage of the bees from below. It will be obvious that the number of honey-boxes will be according to the number of brood-boxes on which they are placed, as above said.

What I claim as my improvement, and desire to secure by Letters Patent, is—

The herein-described extension bee-hive, when constructed and arranged in the manner and for the purpose substantially as set forth.

JOHN COATS.

Witnesses:
W. H. BURRIDGE,
FRANK S. ALDEN.